United States Patent [19]

Zabrocki et al.

[11] Patent Number: 5,334,450
[45] Date of Patent: Aug. 2, 1994

[54] WEATHERABLE STYRENIC FILM STRUCTURES WITH INTERMEDIATE TIE LAYER AND LAMINATES THEREOF

[75] Inventors: Vincent S. Zabrocki, Newark; Robert H. Kelch, Granville, both of Ohio

[73] Assignee: The Dow Chemical Company, Midland, Mich.

[21] Appl. No.: 886,659

[22] Filed: May 20, 1992

[51] Int. Cl.⁵ .................................. B32B 27/08
[52] U.S. Cl. ............................... 428/332; 428/515; 428/516; 428/461; 428/462; 428/463; 156/79; 156/196
[58] Field of Search ............... 428/461, 463, 462, 460, 428/910, 421, 422, 215, 516, 515, 339, 335, 332; 524/413, 495, 87, 547, 517, 505; 526/313; 523/340; 156/79, 196

[56] References Cited

U.S. PATENT DOCUMENTS

| | | | |
|---|---|---|---|
| 3,173,893 | 3/1965 | Fertig et al. | 526/313 |
| 3,368,916 | 2/1968 | Hattori | 428/335 |
| 3,473,996 | 10/1969 | Whalen | 428/339 |
| 3,804,705 | 4/1974 | Kishikawa et al. | 428/463 X |
| 3,860,551 | 1/1975 | Narayana et al. | 524/505 |
| 3,970,718 | 7/1976 | Takahashi et al. | 525/76 |
| 4,202,948 | 5/1980 | Peascoe | 525/70 |
| 4,302,554 | 11/1981 | Nabeta et al. | 525/71 |
| 4,338,378 | 7/1982 | Nabeta et al. | 428/462 |
| 4,341,885 | 7/1982 | Schepers | 525/211 |
| 4,341,885 | 7/1982 | Schepers | 525/211 |
| 4,373,063 | 2/1983 | Sakano et al. | 525/71 X |
| 4,397,987 | 8/1983 | Cornell | 525/72 X |
| 4,404,248 | 9/1983 | Spinelli et al. | 428/460 |
| 4,424,309 | 1/1984 | Schepers | 525/211 |
| 4,438,171 | 3/1984 | Wefer | 428/421 X |
| 4,440,825 | 4/1984 | Paddock | 428/421 X |
| 4,444,840 | 4/1984 | Wefer | 428/422 |
| 4,444,841 | 4/1984 | Wheeler | 428/463 X |
| 4,468,487 | 8/1984 | Schepers | 524/87 |
| 4,522,971 | 6/1985 | DeBergalis | 524/547 |
| 4,525,521 | 6/1985 | Den Hartog et al. | 524/517 |
| 4,528,221 | 7/1985 | Komatsuzaki et al. | 428/910 X |
| 4,563,505 | 1/1986 | Atomori et al. | 525/67 |
| 4,576,860 | 3/1986 | Fink et al. | 156/196 |
| 4,582,871 | 4/1986 | Noro et al. | 524/413 |
| 4,591,533 | 5/1986 | Antonelli | 428/515 |
| 4,592,861 | 6/1986 | Bekele et al. | 524/495 |
| 4,666,961 | 5/1987 | Nauman | 523/340 |

(List continued on next page.)

FOREIGN PATENT DOCUMENTS

| | | |
|---|---|---|
| 8660580 | of 1985 | Australia . |
| 887931 | of 1980 | Belgium . |
| 104899 | of 1982 | European Pat. Off. . |
| 0037609 | of 1984 | European Pat. Off. . |
| 224688 | of 1985 | European Pat. Off. . |
| 278563 | of 1987 | European Pat. Off. . |
| 2843987 | of 1978 | Fed. Rep. of Germany . |
| 6072024 | of 1979 | Japan . |
| 8196239 | of 1982 | Japan . |

(List continued on next page.)

Primary Examiner—Paul J. Thibodeau
Assistant Examiner—David Abraham

[57] ABSTRACT

A weatherable film for lamination to a non-weatherable substrate, including, for example a three-layer film structure including:

at least one first surface layer of a weatherable polymer comprising (a) AES, ASA, SAN or mixtures thereof or (b) any of the polymers of (a) blended with PVC, CPE, aliphatic polyurethanes or saturated styrenic block copolymers; said layer having a 1 percent secant modulus of greater than about 150,000 psi;

at least one second intermediate layer being a tie layer underlying the weatherable layer, said intermediate tie layer being adjacent to and adhered to the weatherable layer, said intermediate tie layer having a modulus of less than about 150,000 psi; said tie layer adherable to at least a third underlying layer; and at least one third layer underlying the tie layer, said third layer adjacent to and adhered to the tie layer said third layer having a modulus of less than about 150,000 psi.

15 Claims, 1 Drawing Sheet

U.S. PATENT DOCUMENTS

| | | | |
|---|---|---|---|
| 4,680,234 | 7/1987 | Kelch | 428/461 |
| 4,724,186 | 2/1988 | Kelch | 428/461 X |
| 4,731,401 | 3/1988 | Moteki et al. | 525/211 X |
| 4,885,342 | 12/1989 | Bakker | 525/211 X |
| 4,910,067 | 3/1990 | O'Neill | 156/79 X |
| 4,936,936 | 6/1990 | Rohrbacher | 428/516 |
| 4,992,322 | 2/1991 | Currey et al. | 428/215 |

FOREIGN PATENT DOCUMENTS

| | | |
|---|---|---|
| 8217181 | of 1982 | Japan . |
| 8222133 | of 1982 | Japan . |
| 9073947 | of 1982 | Japan . |
| 9178250 | of 1983 | Japan . |
| 2060236 | of 1988 | Japan . |
| 7010007 | of 1969 | Netherlands . |
| 1464692 | of 1975 | United Kingdom . |

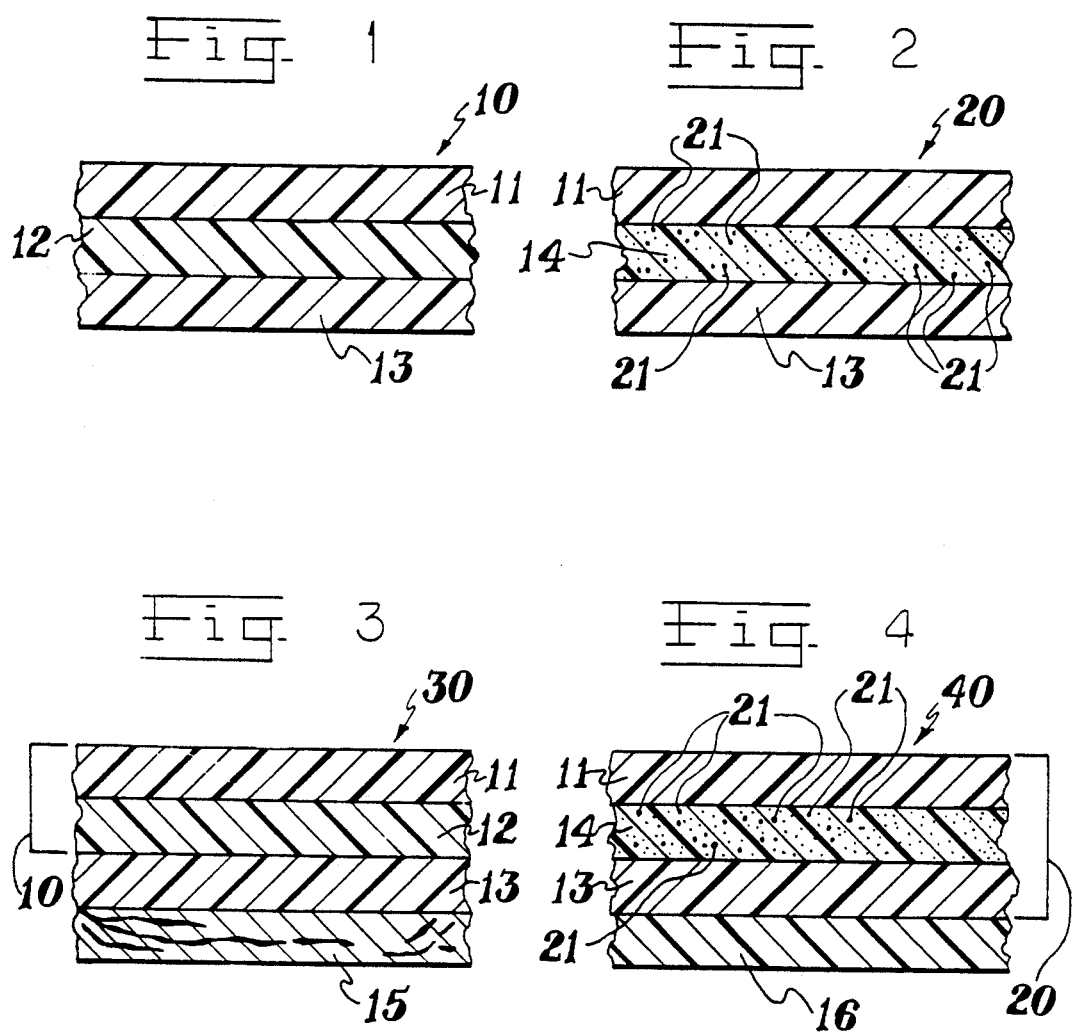

WEATHERABLE STYRENIC FILM STRUCTURES WITH INTERMEDIATE TIE LAYER AND LAMINATES THEREOF

BACKGROUND OF THE INVENTION

The present invention relates to weatherable films for providing weatherable surface coating for numerous substrates. More particularly, the present invention relates to at least a three-layer flexible film structure including at least one outer weatherable layer and at least two underlying layers.

Various films and film structures that exhibit weather resistant properties are known in the art. For example, various structures employing AES (acrylonitrile-ethylene/propylene rubber-styrene) graft copolymers or ASA (acrylonitrile-styrene-acrylate rubber) graft copolymers are described in U.S. Pat. Nos. 4,438,171; 4,440,825; 4,444,840; and 4,444,841.

U.S. Pat. No. 4,438,171 discloses a coextruded sheet product having a total thickness of from 25 to 500 mils by coextruding an AES weatherable film surface layer on an underlaying thermoplastic sheet. U.S. Pat. No. 4,438,171, however, does not disclose coextruded film structures, but instead discloses coextruded sheet structures.

U.S. Pat. No. 4,438,171 describes a coextruded sheet structure of 25 to 500 mils, the surface layer of the sheet structure being 3 to 150 mils of AES graft polymer. The total thickness of the sheet precludes the sheet from being used in applications where thin films (generally less than 25 mils and preferably less than 10 mils) are used. Thin film generally is made on different types of equipment than thick sheet. There is a difficulty in extruding a thin film on a thick layer due to viscosity differences. A uniform film gauge across a thick sheet structure is not readily achieved. Since different polymer viscosities exist, different flow properties exist. Therefore, at a thicker gauge, it becomes more difficult to coextrude, for example, a 3 mil onto a 25 mil substrate.

U.S. Pat. No. 4,440,825 discloses a thick, foamed two-layer structure more specifically an AES polymer (non-specified EPDM) laminated onto a rigid foamed thermoplastic such as a foamed ABS or foamed PVC which is compatible with the AES. The Example in U.S. Pat. No. 4,440,825 describes an unexpanded ABS core 0.10 inches (100 mils) thick (which can be expanded to 400 mils when foamed), with 0.05 inch (50 mils) adjacent solid ABS layers, and AES weatherable skins of 0.025 inches (25 mils) thickness. Accordingly, U.S. Pat. No. 4,440,825 is directed toward very thick sheet production, and not thin films. Also, the structure described in U.S. Pat. No. 4,440,825 is assembled by lamination and not coextrusion.

U.S. Pat. No. 4,444,840 discloses a laminate with a surface monolayer (not a multilayer) produced from calendared 4 to 50 mil AES. Using the process of U.S. Pat. No. 4,440,840, one can not bind, for example, AES to polyethylene or polypropylene or other non-adhesiveable, non-compatible layers. It is desired to provide a film that can be integrally attached to layers of different polymers, to an adhesive, and not to bind different non-compatible, substrates using an adhesive backed film.

U.S. Pat. No. 4,444,841 discloses an extruded monolayer AES weatherable film having a thickness of from 1 mil to 10 mils and the use of said film as a surface layer on laminates. The laminate disclosed can be a variety of materials including thermoplastics and non-plastic materials. U.S. Pat. No. 4,444,841 describes an AES film of 1 to 10 mils made by a blown film process for lamination to metal or cellulosics. Such a blown film is typically less costly and has a higher quality than a calendered film. It is desired to provide a cast extrusion or calendered film rather than blown film.

U.S. Pat. No. 4,444,841 does not teach coextrusion or making a multilayered adhesive containing structure. U.S. Pat. No. 4,444,841 teaches that where the AES is "not inherently mutually adhesive" to wood or metal, a suitable material may be applied to the AES film or substrate prior to lamination, which may involve pressure and temperature to assist in adhesion. The Example in U.S. Pat. No. 4,444,841 describes a liquid based heat sensitive polyurethane adhesive being applied to metal to bond the AES film to the metal, but does not teach a coextruded adhesive layer on the AES. There is still a need in the industry for a multilayer film with improved properties over a monolayer film such as taught in U.S. Pat. No. 4,444,841.

Typically, monolayer AES-type films require an aqueous or solvent-based liquid adhesive that adheres both to a substrate and the film for application of the film to the structure. For example, a liquid adhesive is required to bond a wood substrate to a film. Also needed is the requisite equipment to apply and dry the liquid adhesive prior to applying the film to the substrate. Such a process is costly and complex due to stringent industrial hygiene requirement and environmental concerns and solvent recovery or disposal requirements. It is desired to provide a film and process which eliminates the need for liquid adhesives to adhere weatherable films such as monolayer AES-type films to a desired substrate.

Other coextruded film structures are also known. For example, U.S. Pat. Nos. 4,680,234 and 4,724,186 disclose weatherable coextruded flexible films and laminated structures thereof. The weatherable film layer comprises a blend of a vinyl chloride polymer, an interpolymer comprising ethylene and at least one carboxylic acid or ester thereof containing ethylenic unsaturation, and a chlorinated polyolefin. The other co-extrudates of the multilayer coextruded film of U.S. Pat. Nos. 4,680,234 and 4,724,186 can be an adhesive layer and optionally an interlayer comprising a copolymer of ethylene and vinyl acetate.

While a coextruded film structure having an adhesive layer, an interlayer and a weatherable resistant layer of a blend is disclosed in the above patents, AES and ASA-type films are not readily adherable to commonly known thermoplastic ethylene copolymer and terpolymer adhesive polymers such as ethylene acrylic acid (EAA), ethylene ethylacrylate (EEA) ethylene methylacrylate (EMA) ethylene vinyl acetate (EVA) and ethylene methyl acrylic acid (EMAA), which can be used to adhere the film to a substrate. The chlorinated polyethylene (CPE) and polyvinylchloride (PVC) blends disclosed in U.S. Pat. Nos. 4,680,234 and 4,729,186 have generally low 1% secant modulus value of less than 150,000 psi. It is desired to produce a higher modulus, higher hardness and more scratch resistant polymeric surface than that which is achieved using the teachings of U.S. Pat. Nos. 4,680,234 and 4,729,186. Thus, there still exists a need in the industry for a multi-layered weatherable coextruded film which has good adhesion and is readily adherable to a variety of substrates such as wood, metal, plastic and other structural substrates.

There is also a need in the industry to provide an economical coextruded film which is reprocessable i.e., a film which allows scrap material or rejects to be recycled readily.

In addition, there is still a need in the industry for a film having exceptional stability to ultraviolet light degradation and improved weathering characteristics.

SUMMARY OF THE INVENTION

The present invention is directed to at least a three-layer film structure adapted for use as a weatherable surface coating on a substrate including at least one first layer of a weatherable polymer; at least a second underlying intermediate tie layer adjacent the weatherable polymer layer, said tie layer intimately adherable to and compatible with the weatherable polymer layer; said intermediate tie layer adapted to be intimately adherable to and compatible with a third layer adjacent to the intermediate tie layer; and a third layer adhered to said intermediate tie layer and adapted to be intimately adherable to a substrate.

BRIEF DESCRIPTION OF THE DRAWINGS

FIGS. 1 and 2 show enlarged, partial cross-sectional views of different embodiments of a film structure of the present invention.

FIGS. 3 and 4 show enlarged, partial cross-sectional views of various film structures of the present invention adhered to a substrate.

DETAILED DESCRIPTION OF THE PREFERRED EMBODIMENTS

With reference to FIG. 1, the present invention in its broadest scope includes a three-layer film structure 10 adapted for use as a weatherable surface coating on a substrate. The film 10 comprises at least one first layer 11 being an outer weatherable layer produced from weatherable polymers or blends of weatherable polymers, at least one second layer 12 being an underlying intermediate tie layer adhered to the weatherable layer 11; and at least one underlying third layer 13 being a thermoplastic adhesive layer.

The weatherable polymer layer 11 may be monolayer as shown in FIG. 1 or multilayer (not shown). The outer weatherable layer 11 may be made from various weather resistant polymer materials including, for example, (a) ethylene/propylene/nonconjugated diene-reinforced styrene/acrylonitrile copolymers (AES) or butyl acrylate-reinforced styrene/acrylonitrile copolymer (ASA), styrene acrylonitrile (SAN) or mixtures thereof and (b) any of the polymers of (a) blended with poly vinyl chloride (PVC), chlorinated polyethylene (CPE), aliphatic polyurethane, saturated styrenic block copolymers or mixtures of PVC and CPE.

The outer weatherable layer 11 is preferably extruded from weatherable polymers, for example, AES or ASA. When a rubber modified SAN, such as AES or ASA, is used for the outer weatherable layer 11, preferably the EPDM and/or acrylate rubber modifier content is from about 5 weight percent to about 40 weight percent, and more preferably from about 15 weight percent to about 25 weight percent. Commercially sold AES resins include, for example, ROVEL TM (a trademark of The Dow Chemical Company) and commercially sold ASA-type resins include for example Geloy TM resins (commercially available from General Electric Corporation) or Centrex TM resins (commercially available from Monsanto). Other materials useful for the weatherable layer include stabilized polyvinyl chloride (PVC), such as commercially available Duracap TM and Geon TM (commercially available from BF Goodrich) resins; acrylic, such as polymethylmethacrylate (PMMA) including commercially available Plexiglas TM (commercially available from Rohm & Haas) resins; fluoropolymers, such as (polyvinylidene fluoride) PVDF, such as Kynar TM (commercially available from Atochem) resins; and the like.

The weatherable layer preferably has a 1 percent secant modulus of at least about 150,000 pounds per square inch (psi) and preferably at least about 250,000 psi.

When a blend of polymers is used for the weatherable layer 11, generally, the styrenic polymers of (a) are from about 10 to about 90 weight percent and preferably from about 50 to about 90.

For some applications, a blend of polymers employed as the weatherable outer layer 11 can bey for example, an AES or ASA-type resin blended with an elastomer. The elastomer can be, for example, an elastomer which is compatible with the AES and ASA resin and is weatherable. The elastomer can be selected, for example, from the group comprising chlorinated polyethylene, aliphatic urethane, and saturated styrenic block copolymers. The use of the blend composition advantageously improves the stress whitening resistance of the AES and ASA-type weatherable films. The blend can be used in applications wherein stress whitening is likely to occur, for example, in applications where the film is required to bend at some radius of a part being covered, since stress whitening usually occurs at the bend creating an undesirable color change; or in applications in which the substrate is subject to dimensional instability, such as occurs with thermally induced expansion and contraction of the substrate. The elastomer employed in the weatherable thermoplastic composition blend is preferably present in an amount of from about 10 percent by weight to about 50 percent by weight, more preferably from about 10 weight percent to about 35 weight percent.

The second intermediate tie layer 12 of the three-layer film structure 10 of the present invention, is at least one underlying layer which may also be monolayer as shown in FIG. 1 or multilayer (not shown). The second layer 12 is intimately adherable to and compatible with the outer weatherable layer 11 and the second layer 12 is adapted to be intimately adherable to another polymeric underlying layer.

The intermediate tie layer 12 employed in the present invention preferably has a 1 percent secant modulus of less than about 200,000 psi, more preferably, less than about 150,000 psi. The intermediate tie layer employed in the present invention may include, for example, CPE, styrenic diblock and triblock polymer, copolyamide adhesives, copolyester adhesives, polyurethane adhesive, PVC, ethylene propylene diene copolymers and mixtures thereof.

Herein, the term "tie layer" is made in reference to the second layer 12 which functions as a layer which ties or bonds together the outer weatherable layer 11 to another layer. For example, in the three-layer embodiment (shown in FIG. 1) of the film of the present invention, the tie layer 12 serves to bond the weatherable layer 11 to the third layer 13.

An additional function of the tie layer 12 of a three-layer film structure might be to more easily facilitate film scrap recycle. Scrap product needs to be recycled back into the product for economic reasons (low production unit ratio and good raw material utilization) and for environmental reasons (reduce landfill). However, recycling the film scrap back into the weatherable layer will result in a "less than prime" blend which will have reduced weatherability. Since the tie layer polymer must be adherable to the top weatherable layer, a blend of the two polymer materials will usually be compatible. Film or sheet recycle from edge trim, scrap roll recycle, or off-grade material can be recycled or back-blended into the tie layer 12. The recycle content of the tie layer will typically be from about 0 weight percent to about 70 weight percent, preferably from about 20 weight percent to about 50 weight percent.

The third layer 13 may also be monolayer or multi-layer and is intimately adherable to and compatible with the intermediate tie layer and said third layer is adapted to be intimately adherable to a substrate or another polymeric underlying layer. The third layer employed in the present invention may be, for example, any of the materials used as the intermediate tie layer 12, or thermoplastic ethylene copolymer and terpolymer adhesive polymers such as EAA, EEA, EMA, EVA, EMMA, maleic anhydroxide grafted ethylene copolymers and mixtures thereof. FIG. 3 a shows thermoplastic adhesive layer 13 bonding the film structure 10 to a substrate 15.

The adhesive layer 13 has a 1 percent secant modulus less than about 150,000 psi and preferably less than about 100,000 psi, and must be adherable to the intermediate tie layer and must be adherable to the substrate (such as plastic, metal, wood, etc.).

Any of the layers described above including, the weatherable polymer layer 11, the intermediate tie layer 12 or the third layer 13 may contain additional additives or ingredients that will not adversely effect the properties of the layers. The additives may include, for example, colorants, ultraviolet (UV) and thermal stabilizers, fillers, antiblock agents, antioxidants, processing aids, lubricants, impact modifiers, pigments, gloss-reducing agents such as inorganic particles (talc, silicon dioxide) and the like in a total amount ranging from about 0.01 weight percent to about 25 weight percent, preferably from about 0.05 weight percent to about 20 weight percent.

With reference to FIG. 1 again, there is shown one embodiment of the present invention including a three-layer film 10 comprising a top weatherable layer 11, an intermediate tie layer 12 and a third layer 13 underlying the intermediate tie layer 12. The multilayer film embodiment shown in FIG. 1 is particularly useful when the third layer 13 does not readily adhere to the weatherable film 11, thus necessitating the tie layer 12. In addition, the three-layer film structure 10 is advantageously useful when the weatherable film does not readily adhere to a substrate 15 (shown in FIG. 3) such as a non-plastic substrate including for example wood, thus requiring a third layer 13 to bond the substrate to the multilayer film 10. Furthermore, the embodiment shown in FIG. 1, is advantageously used when the tie layer 12 is not directly adherable to the substrate 15.

Referring to FIG. 2, there is shown another particularly advantageous embodiment of a film 20 of the present invention, including an underlying intermediate tie layer 14 having incorporated therein pigment material 21. The pigment material, in this instance, may be carbon black. The layer 14 is comprised of the same materials as layer 12 of FIG. 1 except that FIG. 2 shows the carbon black 21 incorporated therein. The use of carbon black in layer 14 is to further stabilize the film structure for long-term weatherability. This stabilization can best be achieved by incorporation of carbon black and additional conventional UV stabilizers, such as hindered amine light stabilizers (HALS).

Typical organic UV stabilizers such as HALS, benzophenone or benzotriazole UV absorbers, or hindered phenolic antioxidants, are eventually consumed by the stabilization mechanisms or are lost from the film by stabilizer migration and volatilization out of the film matrix. This loss of stabilizer results in degradation of the film and loss of weatherable characteristics. In the case of a non-weatherable resin that needs to be UV stabilized, addition of stabilizer will provide weatherability until the stabilizer is eventually consumed or lost due to migration. However, by adding carbon black particles 21 to the resin layer 14, substantial improvement in polymer stabilization and weatherability can be achieved. Carbon black is well known to be an excellent UV stabilizer. Additionally, the black absorbs all of the UV radiation that causes polymer degradation. Thus, carbon black will protect all underlying polymer layers, adhesive or substrate from degradation by UV radiation. The carbon black utilized can be of any type, although small particle size grades of black provide the best UV screening and stabilization.

The black color imparted by the carbon black, however, is objectionable and not aesthetically appealing for most consumer applications. In the particular embodiment of the present invention shown in FIG. 2 a pigmented weatherable resin layer 11 is coextruded over a black pigmented and UV stabilized resin layer 14. Additional layers can be coextruded beneath the black pigmented layer 14. All underlying layers will be shielded from destructive UV radiation by the black pigmented layer 14. The top weatherable pigmented layer 11 of the film 20 should be of sufficient gauge and pigment loading to cover and hide the underlying black layer 14.

The black layer 14 can be comprised of a lower cost, non-weatherable polymer, but which must be adherable to and compatible with the weatherable polymer. Additionally, other coextruded layers can lie adjacent to the black pigmented layer. The black layer provides excellent UV stability and weatherability to the non-weatherable second layer. The black layer 14 also provides UV screening and protection to all underlying coextruded layers, adhesive layers, or substrates. For example, as shown in FIG. 4, a film 20 including the black layer 14 covers a layer 13 and substrate 16. Additionally, the black coextruded layer 14 provides for good structure recyclability by allowing edge trim, scrap stock, off-grade product, etc., to be recycled back into the film without adversely affecting the overall weatherability of the structure.

As illustration of one particular embodiment of the present invention, a desired weatherable film for lamination to wood or metal might consist of a pigmented weatherable AES or ASA polymer (such as ROVEL TM or Geloy TM) coextruded over a black pigmented CPE polymer layer (such as TYRIN TM) which is in turn coextruded over an EAA adhesive layer (using a PRIMACOR TM resin). The outer ROVEL TM layer will provide excellent weatherability, the black CPE layer provides adhesion to the RO- VEL TM, film recyclability (into the CPE layer), improved film properties, and lower cost. The EAA adhesive layer will provide adhesion to the wood substrate.

The film of the present invention may be prepared utilizing any number of well known processes including, for example, coextrusion; coating processes such as extrusion coating, spray coating, and roll coating; and lamination. The processes used to prepare the film of the present invention are described in more detail in Modern Plastics Encyclopedia, McGraw-Hill, 1990, pages 252 to 270.

The total thickness of the film of the present invention, including for example film 10 or film 20, is less than about 25 mils, preferably from about 1 mil to about 15 mils, more preferably from about 3 to about 10 mils. Suitably, each layer of a film structure prepared according to the present invention can be less than 20 mils and preferably less than 10 mils. In one preferred embodiment, the weatherable layer is from about 2 mils to about 10 mils, the tie layer is suitably from about 1 mil to about 5 mils and the third layer is from about 1 mil to about 5 mils in thickness.

The film structure of the present invention can be applied to a desired substrate by any well known techniques in the art and preferably by means of heat and pressure. Conventional processes include, for example, hot roll lamination, in-mold injection molding, vacuum/thermoforming and compression molding described in Modern Plastics Encyclopedia, McGraw-Hill, 1990, pages 258-354.

Several weatherable polymer films of the present invention have been identified as a desirable film coating or cap stock over lower cost or non-weathering construction materials. These materials could be wood, metal, or plastic. For instance, applications can include but not be restricted to exterior siding, metal roofs, plastic shutters, doors, window lineals, and automotive coatings. The weatherable exterior coating is employed with these substrates to minimize maintenance such as painting, and to provide aesthetics and long term weatherability.

EXAMPLE 1

In this Example, a three-layer coextruded film was prepared in accordance with the present invention and then laminated to a substrate.

An adhesive layer was coextruded onto a two-layer coextruded structure to form a three-layer coextruded film. The first layer of the three-layer film was an outer weatherable layer comprised of a blend having a 1% secant modulus of 110,000 psi of 50 percent of an AES-ASA polymer blend (ROVEL TM XU-74095.00 available from The Dow Chemical Company) and 50 percent of a CPE polymer (TYRIN TM 0636 available from The Dow Chemical Company) with 10 phr of a shale color concentrate. The second layer or middle tie layer of the three-layer film layer was comprised of a stabilized CPE compound having a 1% secant modulus of 2,000 psi (TYRIN TM 3611 available from The Dow Chemical Company plus conventional process stabilizer) having 2 phr of a UV stabilizer concentrate and 4 phr of a carbon black concentrate. The third layer of the three-layer film was a thermoplastic heat activated EAA adhesive layer having a 1% secant modulus of 12,300 psi (PRIMACOR TM 3330 available from The Dow Chemical Company) and 2 phr of a UV stabilizer concentrate.

The outer weatherable first layer was approximately 5 mils in thickness, with the intermediate tie layer and adhesive layer being each approximately 1.5 mils in thickness.

The resulting 8 mil coextruded film was thermally laminated onto wood siding with the EAA layer providing adhesion to the wood substrate. The film could not be easily peeled from the wood.

Recycle film could be added into the middle layer without adversely affecting either the weatherability of the top layer or adversely affecting the adhesion characteristics of the EAA adhesive layer to a substrate.

EXAMPLE 2

In this Example a three-layer film was produced in accordance with the present invention and the film's adhesion to a wood board substrate was tested.

The three-layer coextruded film comprising a weathering layer, an interlayer and an adhesive layer was produced on a conventional cast film line. The top weathering layer of the three-layer film was comprised of an AES-ASA polymer resin (ROVEL TM XU-74095.00 available from The Dow Chemical Company) having a 1% secant modulus of 213,000 psi and 4 parts per hundred clay color concentrate. The second or middle layer of the three-layer film contained a CPE compound having a 1% secant modulus of 2,000 psi (TYRIN TM 3611 available from The Dow Chemical Company and stabilized with conventional process stabilizer). The adhesive layer was an EAA adhesive copolymer having a 1% secant modulus of 1,700 psi (PRIMACOR TM 1430 available from The Dow Chemical Company) and 2 percent of an EAA slip/antiblock concentrate. The three-layered film had a total thickness of 7.5 mils with the outer weatherable layer being 5 mils in thickness and the intermediate and adhesive layers each being about 1.25 mils in thickness. The resulting film was chilled and wound on a core.

A sample of the film was heat sealed at 350° F., 40 psi for 2 seconds onto a piece of particle wood board.

EXAMPLE 3

In this Example a three-layer coextruded film was produced and the film laminated to a substrate.

The three-layer film was produced on the same equipment as described in Example 2 above.

The first layer of the three-layer film was a weathering layer having a 1% secant modulus of 170,000 psi comprised of a blend of 75 weight percent AES-ASA polymer (ROVEL TM XU-74095.00 available from The Dow Chemical Company) and 25 weight percent CPE polymer (TYRIN TM 3611 available from The Dow Chemical Company with conventional process stabilizer) and 4 pph clay color.

The second layer of the three-layer film was comprised of a styrene-butadiene block copolymer (Stereon 841A available from Firestone) plus 2 phr of a 1% secant modulus having a 9,900 psi UV concentrate.

The third layer of the three-layer film was an EAA adhesive layer having a 1% secant modulus of 10,200 psi (80 weight percent PRIMACOR TM 1430 and 20 weight percent PRIMACOR TM 5980) with 2 phr of a slip/antiblock concentrate.

The resulting film was vacuum thermoformed at 320° F. over a piece of rough sawn fir wood board. The resulting laminate had excellent contouring of the wood grain and excellent adhesion. Attempts to peel the film from the wood resulted in tensile failure of the film and cohesive failure of the wood.

What is claimed is:

1. A flexible film structure adapted for use as a weatherable surface coating on a substrate, comprising:
   a) at least one weatherable layer comprising from about 50 weight percent to 100 weight percent of a weatherable polymer selected from the group consisting of acrylonitrile-ethylene/propylene rubber-styrene, acrylonitrile-styrene-acrylate rubber, styrene acrylonitrile, and blends thereof, said weatherable layer having a 1 percent secant modulus of greater than about 150,000 psi;
   b) at least one intermediate tie layer, underlying the weatherable layer comprising a thermoplastic polymer selected from the group consisting of chlorinated polyethylene, styrenic block polymer, copolyamide adhesives, copolyester adhesives, polyvinyl, polyurethanes, ethylene propylene diene copolymers, and mixtures thereof, said intermediate tie layer being adjacent to and adhered to said at least one weatherable layer, said intermediate tie layer having a 1 percent secant modulus of less than about 150,000 psi; and
   c) at least one adhesive layer, underlying said intermediate tie layer, comprising an ethylene copolymer or terpolymer, chlorinated polyethylene, styrenic block polymer, copolyamide adhesive, copolyester adhesive, polyvinyl chloride, polyurethane, or a mixture thereof, said adhesive layer adjacent to and adhered to said at least one intermediate tie layer, said adhesive layer having a 1 percent secant modulus of less than about 150,000 psi;

wherein the total thickness of the film structure is less than about 25 mils.

2. The film of claim 1 wherein of said at least one weatherable layer further comprises less than about 50 weight percent of an elastomer selected from the group consisting of PVC, CPE, aliphatic polyurethanes, and saturated styrenic block copolymers.

3. The film structure of claim 1 wherein the intermediate tie layer is a styrenic block copolymer.

4. The film of claim 1 wherein the intermediate tie layer is a chlorinated polyethylene.

5. The film of claim 1 wherein the ethylene copolymer or terpolymer in said adhesive layer is maleic anhydroxide grafted ethylene copolymer, ethylene acrylic acid, ethylene vinyl acetate, ethylene methacrylic acid or mixtures thereof.

6. The film of claim 1 wherein the weatherable layer, intermediate layer, and/or third layer contains an ultraviolet light stabilizer.

7. The film of claim 6 wherein the ultraviolet stabilizer is from about 0.05 to about 3 weight percent.

8. The film of claim 1 wherein the intermediate tie layer contains pigment.

9. The film of claim 8 wherein the pigment is carbon black.

10. The film of claim 9 wherein the carbon black is from about 0.5 to about 5 weight percent.

11. The film of claim 1 wherein the thickness of the weatherable layer is about 20 mils or less.

12. The film of claim 1 wherein the thickness of the intermediate tie layer is about 20 mils or less.

13. The film of claim 1 wherein the thickness of the adhesive layer is about 20 mils or less.

14. A laminated structure comprising a substrate having adhered thereto a three-layer film structure of claim 1.

15. The laminated structure of claim 14 wherein the substrate is selected from the group consisting of cellulosic materials, metal or polymeric materials.

* * * * *

UNITED STATES PATENT AND TRADEMARK OFFICE
CERTIFICATE OF CORRECTION

PATENT NO. : 5,334,450
DATED : August 2, 1994
INVENTOR(S) : Vincent Stanley Zabrocki and Robert Harold Kelch It is certified that error appears in the above-indentified patent and that said Letters Patent is hereby corrected as shown below:

On the title page, Column 1, under U.S. Patent Documents, line 37, "4,341,885" should correctly appear as --4,341,884--.

Column 9, line 20, "polyvinyl," should correctly appear as --polyvinyl chloride,--.

Column 10, line 4, "PVC," should correctly appear as --polyvinyl chloride,--.

Column 10, line 4 "CPE," should correctly appear as --chlorinated polyethylene,--.

Signed and Sealed this

Fourth Day of July, 1995

*Attest:*

BRUCE LEHMAN

*Attesting Officer*     *Commissioner of Patents and Trademarks*